US007546459B2

(12) United States Patent
Robles et al.

(10) Patent No.: US 7,546,459 B2
(45) Date of Patent: Jun. 9, 2009

(54) GSM-LIKE AND UMTS-LIKE AUTHENTICATION IN A CDMA2000 NETWORK ENVIRONMENT

(75) Inventors: Luis Ramos Robles, Madrid (ES); Lila Madour, Kirkland (CA)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 693 days.

(21) Appl. No.: 11/076,175

(22) Filed: Mar. 9, 2005

(65) Prior Publication Data

US 2005/0251681 A1 Nov. 10, 2005

Related U.S. Application Data

(60) Provisional application No. 60/551,685, filed on Mar. 10, 2004.

(51) Int. Cl.
*H04L 9/00* (2006.01)
*H04K 1/00* (2006.01)

(52) U.S. Cl. .................................. 713/168; 380/270

(58) Field of Classification Search ............ 380/255, 380/259, 270, 277; 713/168; 726/2–4
See application file for complete search history.

(56) References Cited

U.S. PATENT DOCUMENTS

| 6,961,329 | B1* | 11/2005 | Bender et al. ............. 370/342 |
| 2005/0102529 | A1* | 5/2005 | Buddhikot et al. ........ 713/200 |
| 2005/0113067 | A1* | 5/2005 | Marcovici et al. ......... 455/411 |

OTHER PUBLICATIONS

Arkko and Haverinen; Extensible Authentication Protocol Method for 3rd Generation, Authentication and Key Agreement (EAP-AKA); Network Working Group; Dec. 21, 2004; draft-arkko-pppext-eap-aka-15.txt.
Haverinen and Salowey; Extensible Authentication Protocol Method for GSM Subscriber Identity Modules; Network Working Group; Dec. 21, 2004; draft-haverinen-pppext-eap-sim-16.txt.
3GPP TS 43.020 V5.0.0 (Jul. 2007); 3rd Generation Partnership Project; Technical Specification Group Services and system Aspects; Security related network functions (Release 5).
3GPP TS 33.102 V6.0.0 (Sep. 2003); 3rd Generation Partnership Project; Technical Specification Group Services and System Aspects; 3G Security; Security architecture (Release 6).

(Continued)

*Primary Examiner*—Hosuk Song (57) ABSTRACT

An authentication server (e.g., AAA server) is described herein which is located in a CDMA2000 network and used to authenticate a user terminal that is connected to a non-CDMA2000 network. The authentication server receives an access request for authenticating the user terminal connected to the non-CDMA2000 network. Then, it obtains a root secret key shared between the user terminal and the CDMA2000 network and generates a GSM or UMTS-like authentication vector which is used to authenticate the user terminal according to a GSM or UMTS-like authentication method. The access of the terminal to the non-CDMA2000 network is granted upon successful authentication. According to embodiments of the invention, the non-CDMA2000 network can be a WLAN network, and the authentication methods used can be EAP SIP or EAP AKA. The present invention allows one to use authentication servers that were originally intended for WLAN-3GPP interworking scenarios also in WLAN-CDMA2000 network interworking.

11 Claims, 5 Drawing Sheets

OTHER PUBLICATIONS

Haverinen and Salowey; EAP SIM Authentication; Network Working Group; Oct. 27, 2003; draft-haverinen-pppext-eap-sim-12.txt.

Arkko and Haverinen; EAP AKA Authentication; Network Working Group; Oct. 27, 2003; draft-arkko-pppext-eap-aka-11.txt.

Blunk and Vollbrecht; PPP Extensible Authentication Protocol (EAP); Network Working Group: Request for Comments: 2284; Mar. 1998.

IEEE Std 802.1X-2001; IEEE Standard for Local and metropolitan area networks—Port-Based Network Access Control; Jun. 14, 2001.

3GPP TS 33.234 V0.6.0 (Sep. 2003); 3rd Generation Partnership Project; Technical Specification Group Service and System Aspects; 3G Security; Wireless Local Area Network (WLAN) Interworking Security; (Release 6).

Aboba and Simon; PPP EAP TLS Authentication Protocol; Network Working Group; Requests for Commments: 2716; Oct. 1999.

Funk; EAP Tunneled TLS Authentication Protocol (EAP-TTLS); PPPEXT Working Group Internet-Draft; Aug. 2003; draft-ietf-pppext-eap-ttis-03.txt.

Palekar et al; Protected EAP Protocol (PEAP) Version 2; PPPEXT Working Group; Internet-Draft; Oct. 26, 2003; draft-josefsson-pppext-eap-tls-eap-07.txt.

3GPP TS 23.234 V2.0.0 (Sep. 2003); 3rd Generation Partnership Project; Technical Specification Group Services and Systems Aspects; 3GPP system to Wireless Local Area Network (WLAN) Interworking: System Description (Release 6).

Eastlake and Jones; US Secure Hash Algorithm 1 (SHA1); Network Working Group, Request for Comments: 3174; Sep. 2001.

FIPS PUB 186-2; Digital Signature Standard (Dss); Jan. 27, 2000.

Aboba and Beadles; The Network Access Identifier; Network Working Group Request for Comments: 2486; Jan. 1999.

Rigney et al; Remote Authentication Dial In User Service (RADIUS): Network Working Group Request for Comments: 2865 Obsoletes: 2138; Jun. 2000.

Linn; Privacy Enhancement for Internet Electronic Mail: Part I: Message Encryption and Authentication Procedures; Network Working Group Request for Comments: 1421 Obsoletes: 1113; Feb. 1993.

3GPP2 N.S0005-0 Version 1.0; Cellular Radiotelecommunications Intersystem Operations; Jul. 1997.

* cited by examiner

GSM-LIKE AND UMTS-LIKE AUTHENTICATION IN A CDMA2000 NETWORK ENVIRONMENT

CLAIMING BENEFIT OF PRIOR FILED PROVISIONAL APPLICATION

This application claims the benefit of U.S. Provisional Application Ser. No. 60/551,685 filed on Mar. 10, 2004 and entitled "RE-USE OF GSM AND UMTS AUTHENTICATION AND KEY AGREEMENT (AKA)" which is incorporated by reference herein.

BACKGROUND OF THE INVENTION

1. Field of the Invention

The present invention relates in general to security (authentication) features in the wireless communications field and, specifically, to a system and method for providing GSM-like and UMTS-like authentication in a CDMA2000 network environment. In one embodiment, the present invention relates to a system and method for using UMTS-like authentication to enable WLAN-CDMA2000 network interworking.

2. Description of Related Art

The following abbreviations are herewith defined, at least some of which are referred to in the ensuing description of the prior art and the preferred embodiments of the present invention.

Figure 1:
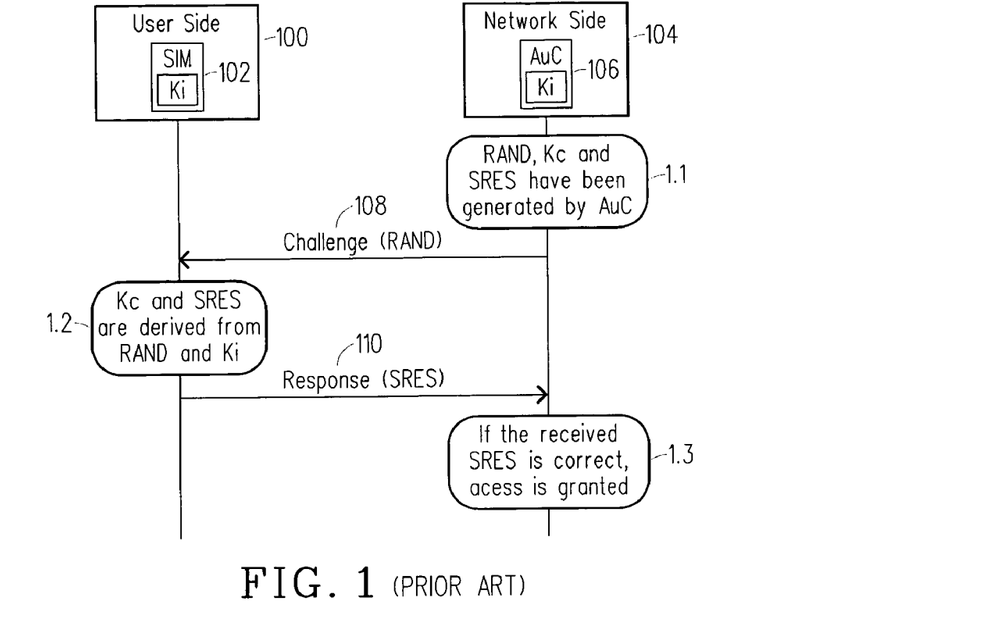
FIG. 1 (PRIOR ART) is a flow diagram that is used to help describe in a high level the traditional GSM AKA authentication method.

3GPP Third Generation Partnership
3GPP2 Third Generation Partnership Project 2
AAA Authentication, Authorization and Accounting
AC Authentication Centre (CDMA2000)
AP Access Point
AK Anonymity Key
AKA Authentication and Key Agreement
AuC Authentication Centre (GSM/UMTS)
CDMA2000 Code Division Mode Access 2000
CHAP Challenge Authentication Protocol
CAVE Cellular Authentication and Voice Encryption
EAP Extensible Authentication Protocol
EAPOL EAP Over LAN
EMSK Extended MSK
EWAS Ericsson WLAN Authentication Server
FA Foreign Agent
GSM Global System for Mobile Communications
GSMA GSM Association
HLR Home Location Register
HRPD High Rate Packet Data
IE Intermediate Entity
IMSI International Mobile Subscriber Identity
LAN Local Area Network
MAC Message Authentication Code
MSK Master Session Key
NAI Network Access Identifier
PAP Password Authentication Protocol
PPP Point-to-Point Protocol
RADIUS Remote Authentication Dial In User Service
RUIM Removable UIM
SIM Subscriber Identity Module
SSD Shared Secret Data
TEK Transient EAP Key
UIM User Identity Module
UMTS Universal Mobile Telecommunications System
USIM UMTS SIM
WCDMA Wideband Code Division Mode Access
WLAN Wireless LAN Referring to FIG. 1 (PRIOR ART), there is a flow diagram used to help describe in a high level the GSM AKA method. GSM AKA is based on a 128-bit secret key, Ki, which in a user side 100 is stored in a Subscriber Identity Module (SIM) 102. In a network side 104, the Ki is stored in an Authentication Centre (AuC) 106. The AuC 106 uses the Ki to derive authentication vectors known as triplets (see box 1.1). Each triplet is composed of:
  RAND: 128-bit random number, to be used as a challenge.
  Kc: 64-bit long key, intended to be used as an encryption key over the air interface.
  SRES: 32-bit response to the challenge.

The values of Kc and SRES depend on RAND. Thus, each triplet (RAND, Kc and SRES) that is generated by the AuC 106 is going to be different from other triplets.

Once the network side 104 has a triplet available, it challenges the user side 100 with the RAND value from the triplet (see signal 108). The SIM 102 generates Kc and SRES using the received RAND and the internally stored Ki (see box 1.2). The user side 100 then sends a response SRES to the network side 104 (see signal 110). The network side 104 then checks the correctness of the response SRES (see box 1.3). If the received SRES is correct, then the network side 104 grants access to the user side 100.

At the end of this procedure, the network side 104 has assurance that the user side 100 is the claimed one, and that the Kc is available at both the user side 100 and the network side 104, but not to anyone who might have been listening to the communication channel. For a more detailed discussion about GSM AKA, reference is made to the following document:
  3GPP TS 43.020 v.5.0.0 "Security Related Network Functions (Release 5)", July 2002.

The contents of this document are incorporated by reference herein.

Figure 2:
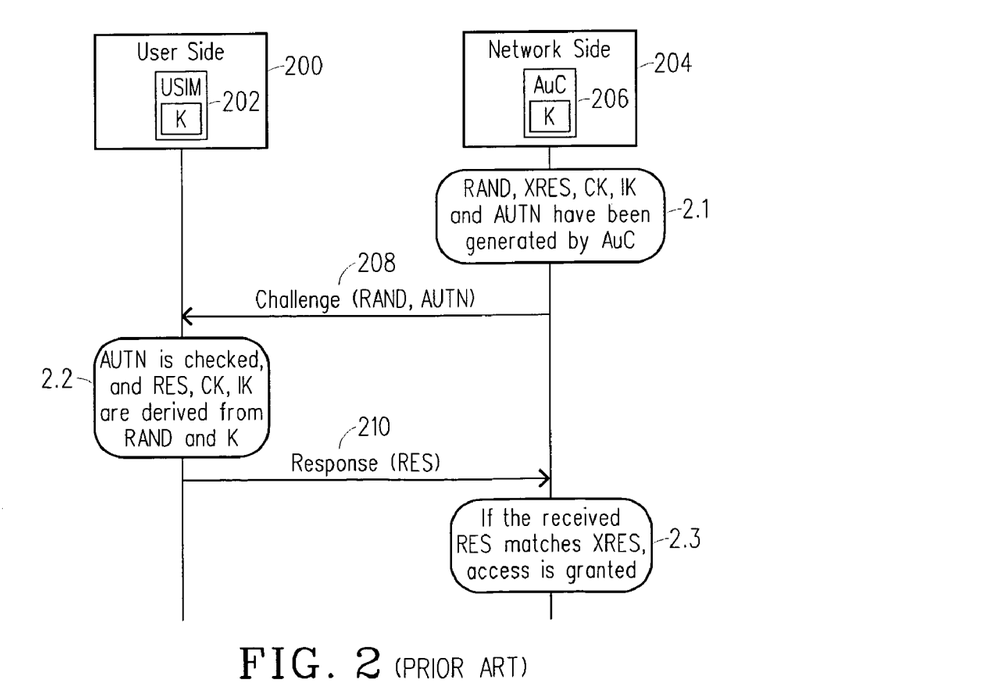
FIG. 2 (PRIOR ART) is a flow diagram that is used to help describe in a high level the traditional UMTS AKA authentication method.

Referring to FIG. 2 (PRIOR ART), there is a flow diagram used to help describe in a high level the UMTS AKA method. The UMTS AKA method is similar to the GSM AKA method, but the UMTS AKA has some extras:
  The user side 200 is assured that the network side 204 is the claimed one.
  An additional key is derived and used to ensure integrity protection over the air interface.
  Longer keys and response values are used for increased security.

As in GSM AKA, there is a 128-bit secret key, K, which in the user side 200 is stored in a UMTS Subscriber Identity Module (USIM) 202. In the network side 204, the secret key K is stored in an Authentication Centre (AuC) 206. The AuC 206 uses this secret key K to derive authentication vectors known as quintets (see box 2.1). Each quintet is composed of:
  RAND: 128-bit random number, to be used as a challenge.
  XRES: 32-bit to 128-bit response to the challenge.
  CK: 128-bit long key, to be used as a cipher key over the air interface.
  IK: 128-bit long key, to be used as an integrity key over the air interface.
  AUTN: 128-bit value, used for network authentication.

As shown in FIG. 2, once the network side 204 has a quintet available, it challenges the user side 200 with the RAND and AUTN values from the quintet (see signal 208). The USIM 202 checks that the AUTN is correct, and then it generates RES, CK and IK, using the received RAND and the internally stored K (see box 2.2). The user side 200 then sends a response RES to the network side 204 (see signal 210). The network side 204 then checks the correctness of the response RES (see box 2.3). If the received RES is correct, then the network side 204 grants access to the user side 200.

At the end of this procedure, both the user side 200 and the network side 204 know that mutual authentication has been achieved. And, both the user side 200 and the network side 204 have access to the CK, IK which are not available to anyone who might be listening to the communication channel.

Referring in particular to the AUTN, the most relevant characteristic of the AUTN value is that it includes a sequence number, SQN, and a message authentication code (MAC). The SQN has a different and predictable value for each authentication attempt. In addition, the SQN needs to be kept synchronized between both sides 200 and 204, because both sides 200 and 204 need to keep track of the SQN value. And, the user side 200 has to check the correctness of the SQN value.

The SQN ensures that each AUTN value is different and therefore it protects against replay attacks. In a replay attack, an attacker eavesdrops a correct challenge which contains the RAND and AUTN. Then, the attacker impersonates the network side 204 using that same challenge. The SQN protects against this, since it ensures that the AUTN is different, even for the same RAND. In other words, the user side 200 would not accept a re-used AUTN.

The MAC has the following properties:
  Its value depends on SQN.
  Knowledge of K is needed in order to generate the MAC.

Thus, upon the reception of AUTN, the user side 200 checks that SQN is correct (i.e. it is not re-used). Then it generates a MAC value using SQN and K, and this MAC is checked to make sure it matches the MAC received in the AUTN, which implies that:
  The network side 204 generated the MAC, since only the network side 204 has knowledge of K (apart of the user side 200).
  The received SQN is the one originally sent by the network side 204.

For a more detailed discussion about UMTS AKA, reference is made to the following document:
  3GPP TS 33.102 v.6.0.0 "Security Architecture (Release 6)", September 2003.

The contents of this document are incorporated by reference herein.

Figure 3:
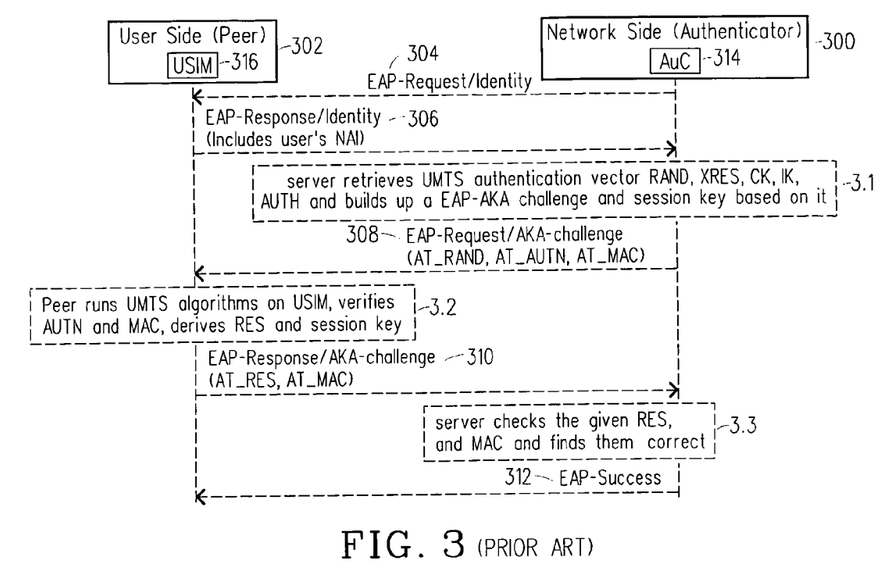
FIG. 3 (PRIOR ART) is a flow diagram that is used to help describe in a high level the traditional GSM-like (EAP SIM) authentication method.
Figure 4:
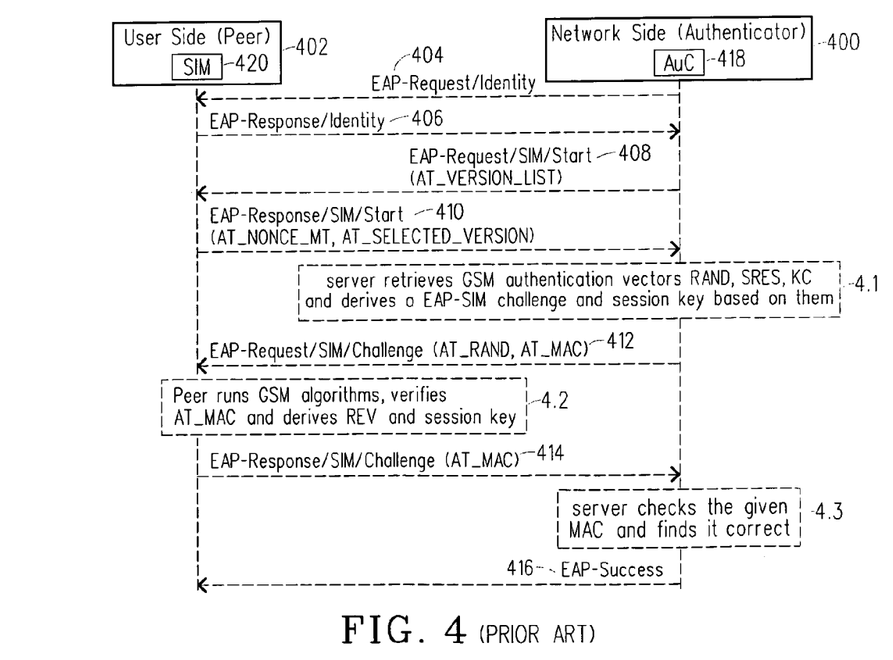
FIG. 4 (PRIOR ART) is a flow diagram that is used to help describe in a high level the traditional UMTS-like (EAP AKA) authentication method.

Referring to FIGS. 3 and 4 (PRIOR ART), there are shown two flow diagrams that are used to help describe in a high level GSM-like (e.g., EAP SIM) and UMTS-like (e.g., EAP AKA) authentication methods. EAP SIM and EAP AKA are EAP methods that take advantage of a GSM or UMTS infrastructure in order to perform authentication in a similar way as GSM AKA and UMTS AKA but for different access networks in which the utilization of an EAP method is more appropriate.

EAP is an authentication framework that supports multiple authentication mechanisms and can be used on dedicated links, switched circuits, and wired as well as wireless links. For example, EAP can be used to perform the authentication in WLAN access networks in which the access control is based on 802.1X. For a more detailed discussion on how EAP can be used in a WLAN access network, reference is made to the following document:
  IEEE Std. 802.1X-2001 "Port-Based Access Control", June 2001.

The contents of this document are incorporated by reference herein.

It should be appreciated that the IEEE Std. 802.1X-2001 does not mandate the utilization of any specific EAP method and, therefore, in principle any EAP method could be used.

On the other hand, 3GPP is working on specifications for the interworking of WLAN access networks and 3GPP networks. For more details about this, reference is made to the following document the contents of which are incorporated by reference herein:
  3GPP TS 33.234 v.0.6.0 "Wireless Local Area Network (WLAN) Interworking Security", September 2003 (Work in progress).

In this document, the authentication is done with EAP SIM (for GSM subscribers) and with EAP AKA (for UMTS subscribers). EAP AKA is discussed below first and as will be appreciated it is basically UMTS AKA adapted for use as an EAP method. The basic authentication process for EAP AKA is depicted in the signal flow diagram of FIG. 3 (PRIOR ART).

As shown in FIG. 3 (PRIOR ART), once an authenticator 300 (i.e. network side 300) has obtained the identity of a peer 302 (i.e. user side 302) (see signals 304 and 306), the authenticator 300 retrieves an UMTS authentication vector from the AuC 314 and sends a challenge to the peer 302 which includes RAND and AUTN as in UMTS AKA (see box 3.1 and signal 308). Additionally, a MAC is sent to the peer 302 in order to protect the integrity of the whole challenge message (see signal 308).

The peer 302 then responds with a RES (as in UMTS AKA) and a MAC to ensure the integrity protection of the response message (see box 3.2 and signal 310). The authenticator 300 checks that the received RES and MAC are correct (see box 3.3). And, if they are correct, then it sends a success message to the peer 302 (see signal 312). As in UMTS AKA, the authenticator 300 generates an UMTS quintet in an AuC 314. And, the peer 300 has a USIM 316 that checks the AUTN and calculates the RES.

Referring now to FIG. 4 (PRIOR ART), there is shown a flow diagram that is used to help describe in a high level the EAP SIM authentication method. EAP SIM is basically GSM AKA adapted for use as an EAP method, but it also includes additional features to overcome some of the limitations of GSM AKA:
  Several GSM triplets are used for one single authentication process, so that the resulting response and derived keys are longer.
  Mutual authentication is provided.

As can be seen in the flow chart, the authenticator 400 (i.e. network side 400) obtains the identity of the peer 402 (i.e. user side 402) (see signals 404 and 406). Then, the authenticator 400 sends the peer 402 a message indicating the version(s) of protocol that are supported (only one version is defined to date) (see signal 408). The peer 402 responds with the selected version and a nonce value (see signal 410).

The authenticator 400 then retrieves several GSM triplets from the AuC 418 and sends a challenge that includes several RAND challenges taken from several GSM triplets and a MAC (see box 4.1 and signal 412). The peer 402 checks this MAC for network authentication (see box 4.2). It should be noted that protection against replay attacks is achieved because the peer 402 sent the nonce to the authenticator 400 which used it to generate the keys that in turn were used to produce the MAC.

At this point, the peer 402 extracts several GSM RAND values from the AT_RAND parameter and generates the corresponding SRES values (see box 4.2). Then, the peer 402 sends the authenticator 400 a MAC that covers the SRES values (see signal 414). The authenticator 400 checks that the received MAC is correct and if it is correct then a success message is sent to the peer 402 (see box 4.3 and signal 416). Similar to GSM AKA, the authenticator 400 generates several GSM triplets in an AuC 418. And, the peer 402 has a SIM 420 that calculates the SRES.

For a more detailed discussion about EAP, EAP SIM and EAP AKA, reference is made to the following documents:

H. Haverinen et al. "Extensible Authentication Protocol Method for GSM Subscriber Identity Modules (EAP-SIM)" draft-haverinen-pppext-eap-sim-16.txt, Dec. 21, 2004.

J. Arkko et al. "Extensible Authentication Protocol Method for 3rd Generation Authentication and Key Agreement (EAP-AKA)" draft-arkko-pppext-eap-aka-15.txt. Dec. 21, 2004.

IETF draft-arkko-pppext-EAP AKA-11 "EAP AKA Authentication", October 2003 (Work in progress).

IETF RFC 2284 "PPP Extensible Authentication Protocol (EAP)", March 1998.

The contents of these documents are incorporated by reference herein.

A discussion is provided next about the authentication process in CDMA2000 networks. Currently, CDMA2000 networks support a number of authentication mechanisms at two different levels. The first level is the radio access level which has two different types of access technologies, known as 1x and HRPD (or data only).

The 1x type of access technology has two authentication mechanisms:
1) A legacy method, known as CAVE, which is based on shared secret keys. CAVE is the only solution deployed today. This mechanism is based on a root key (A-Key) and a shared secret data (SSD) derived from the root key, which is used to authenticate the mobile station.
2) The CDMA2000 standard also defines an enhanced authentication and encryption algorithm (AKA). However, this method is not deployed in CDMA2000 networks today. Like CAVE, this method is based on a root key known only by the authentication centre (network side) and the mobile station (user side).

The HRPD access is an authentication process that is performed using "CHAP over PPP" and a key known only by the mobile station (user side) and the AAA (network side). The key is known as the MN-AAA key.

Once the mobile station (user side) is authenticated at the radio access level, it is allowed to setup a packet data session. Then, a second authentication takes place at the user level which has three different authentication mechanisms. Each of these authentication mechanisms could be used independently of the radio access type and they are: (1) PPP CHAP; (2) PAP; and (3) Mobile IP FA challenge. Except for PAP, the PPP CHAP and Mobile IP FA challenge require a key known only to the mobile station and the authentication centre (AAA). This key is known as the MN-AAA key. It should be appreciated that all of the aforementioned CDMA2000 keys are stored in an UIM or Removable UIM inside the mobile station.

A discussion is provided next about some of the problems with the existing solutions. Currently, GSM-like and UMTS-like authentication (such as in EAP SIM and EAP AKA) can only be used in networks that have a GSM or UMTS infrastructure. However, there are other scenarios where utilization of these authentication methods would be advantageous.

For example, 3GPP2 is working on specifications for the interworking of WLAN access networks and CDMA2000 networks. The authentication mechanisms have not been selected yet, but some basic requirements have been identified:

In order to inter-work with 802.1X based WLAN Access Networks, authentication is to be accomplished preferably by means of an EAP method.

The chosen EAP method should be one of the already available methods provided by IETF.

Preferably, mutual authentication is to be provided.

From the perspective of a worldwide technology provider, the ideal situation would be that the same authentication methods could be used in GSM/UMTS networks and in CDMA2000 networks, so that one single product can be deployed in both markets with as few adaptations as possible. In this sense, EAP SIM and EAP AKA have already been defined as the authentication methods to be used in 3GPP networks (i.e. for GSM and UMTS operators). Moreover, both EAP SIM and EAP AKA fulfill the three basic requirements stated above in order to be acceptable authentication methods for WLAN-CDMA2000 interworking.

However, as explained above EAP SIM and EAP AKA make use of GSM/UMTS infrastructure. That is:

On the network side, the AuC generates authentication vectors (i.e. GSM triplets or UMTS quintets).

On the user side, the secret key is stored in the (U)SIM, which also performs some required calculations (i.e. check AUTN in case of EAP AKA, and calculate responses needed for both EAP SIM and EAP AKA).

Therefore, with the current state of the art, EAP SIM and EAP AKA cannot be used in CDMA2000 networks, due to the lack of a suitable infrastructure both in the network side and the user side. This problem is solved by the present invention.

BRIEF DESCRIPTION OF THE INVENTION

The present invention includes an authentication server (e.g., AAA server) which is located in a CDMA2000 network and used to authenticate a user terminal that is connected to a non-CDMA2000 network. The authentication server receives an access request for authenticating the user terminal connected to the non-CDMA2000 network. Then, it obtains a root secret key shared between the user terminal and the CDMA2000 network and generates a GSM or UMTS-like authentication vector which is used to authenticate the user terminal according to a GSM or UMTS-like authentication method. The access of the terminal to the non-CDMA2000 network is granted upon successful authentication. According to embodiments of the invention, the non-CDMA2000 network can be a WLAN network, and the authentication methods used can be EAP SIM or EAP AKA. The present invention allows one to use authentication servers that were originally intended for WLAN-3GPP interworking scenarios also in WLAN-CDMA2000 network interworking.

BRIEF DESCRIPTION OF THE DRAWINGS

A more complete understanding of the present invention may be had by reference to the following detailed description when taken in conjunction with the accompanying drawings wherein.

DETAILED DESCRIPTION OF THE DRAWINGS

Figure 5:
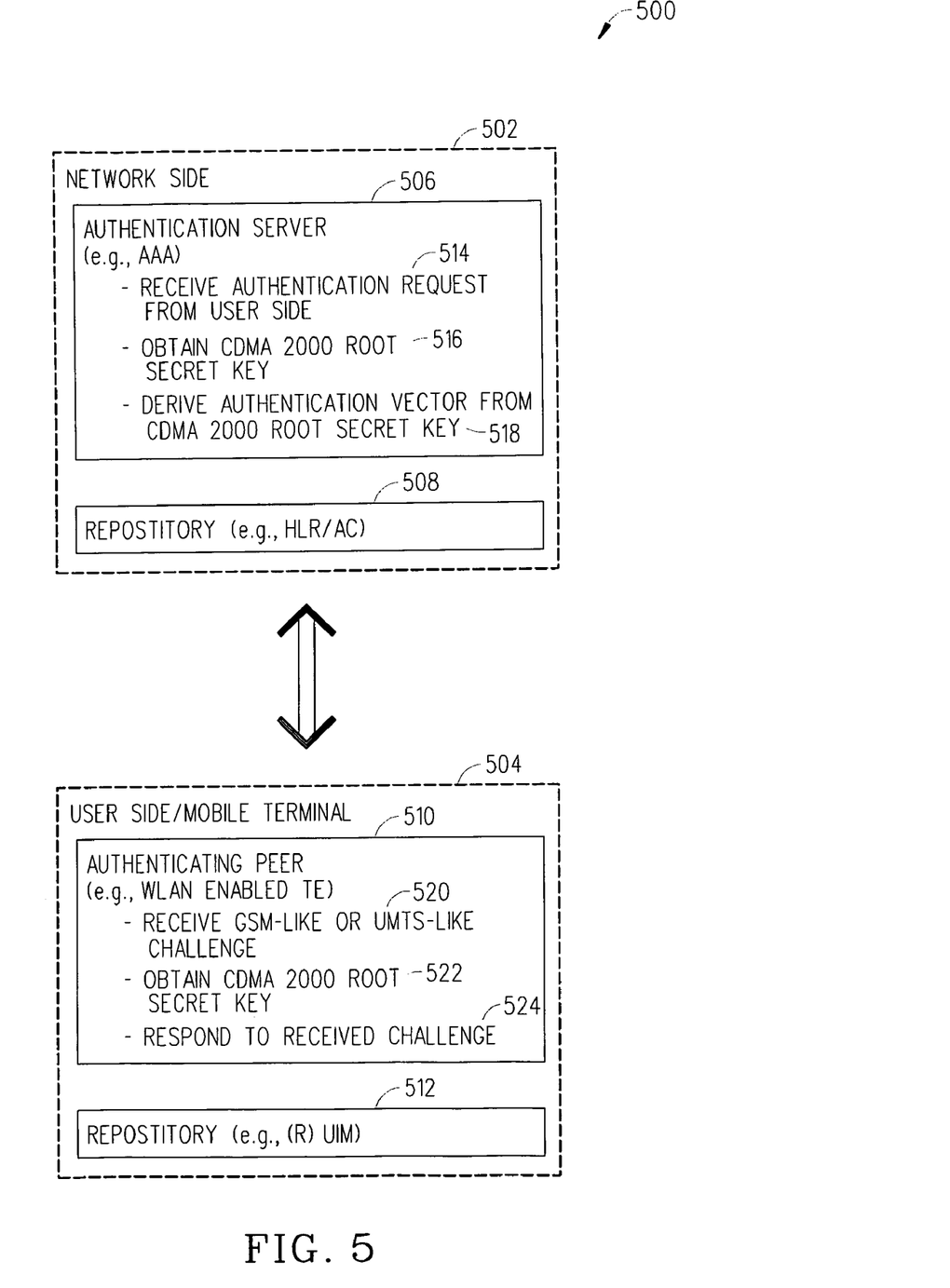
FIG. 5 is a diagram of a communication system that includes a network side (AAA terminal) and a user side (mobile terminal) which both have functionality incorporated therein to adapt and use a root secret key (e.g. one of those already available in CDMA2000 networks, such as SSD or MN-AAA) with a GSM-like authentication method (EAP SIM) or UMTS-like (EAP AKA) authentication method in accordance with the present invention.

The present invention includes a communication system 500 that has functionality in both a network side (e.g., AAA server) and an user side (e.g., user's terminal) wherein a root secret key (e.g. one of those already available in CDMA2000 networks, such as SSD or MN-AAA) is adapted for use with a GSM-like or UMTS-like authentication method, such as EAP SIM or EAP AKA. As shown in FIG. 5, the system 500 includes a network side 502 and a user side 504 (mobile terminal 504). The network side 502 has an authentication server 506 (including a processor 506) and a repository 508 (e.g., HLR/AC 508). The authentication server 506 performs authentication based on a GSM-like or UMTS-like authentication method. For example, this could be a 3GPP AAA server 506 compliant with the requirements defined in 3GPP for WLAN interworking which also incorporates the functions described below in accordance with the present invention. In accordance with the present invention, the authentication server 506 has the following functionality:

Receive an authentication request from user side 504 (box 514).

Obtain the CDMA2000 root secret key from the repository 508 (box 516).

Derive suitable authentication vectors (e.g., GSM triplets or UMTS quintets) using the CDMA2000 root secret key (box 518).

The repository 508 is where the CDMA2000 root secret key is retrieved. For example, if SSD is used as root secret key, then the HLR/AC 508 would act as repository. Or, if MN-AAA is used as root secret key, then the AAA 506 would act as the repository 508.

The user side 504 has an authenticating peer 510 and a repository 512 (e.g., R(UIM) 512). The authenticating peer 510 implements the client side of the GSM-like or UMTS-like authentication method used by the authentication server 506. For example, this could be an EAP SIM compliant client or an EAP AKA compliant client. In accordance with the present invention, the authenticating peer 510 has the following functionality:

Receive a GSM-like or UMTS-like challenge (box 520).

Obtain the CDMA2000 root secret key from the repository 512 (box 522).

Respond to the received challenge (box 524).

The repository 512 is where the root secret key is retrieved. Typically, this would be a (R)UIM 512 when SSD or MN-AAA are used as root secret key. It should be appreciated that root secret key is referred to hereinafter as K_root.

Figure 6:
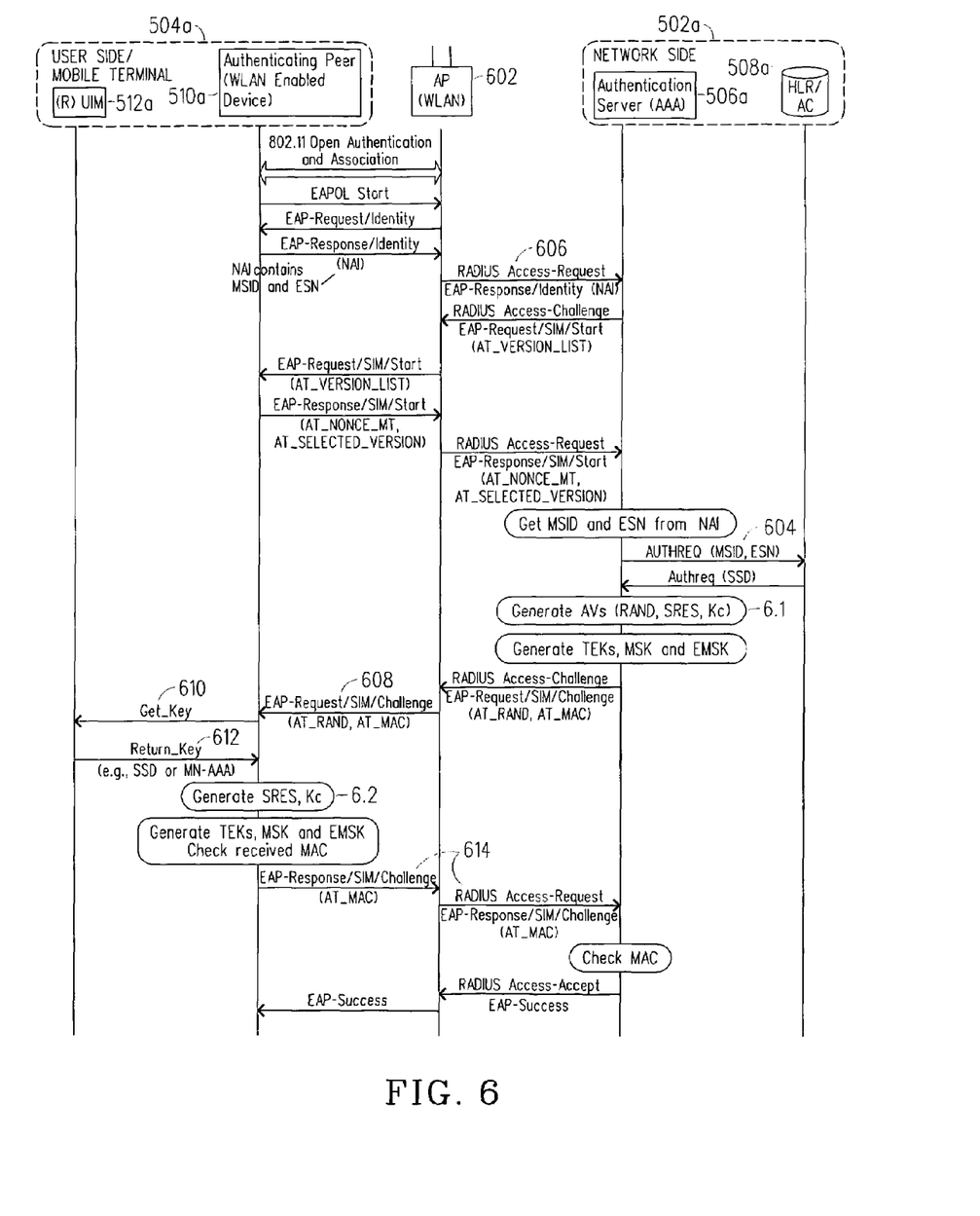
FIG. 6 is a signal flow diagram that illustrates a network side and a user side using a GSM-like authentication method (EAP SIM) in a WLAN-CDMA2000 interworking scenario in accordance with a first embodiment of the present invention.

Following is a detailed discussion about how the authentication server 506 and authenticating peer 510 generate GSM-like authentication values in accordance with a first embodiment of the present invention. To aid in this discussion, an exemplary signal flow diagram is shown in FIG. 6 that illustrates a GSM-like authentication method such as EAP SIM being used in a WLAN-CDMA2000 interworking scenario. The following assumptions have been made to accommodate this particular scenario:

The authentication server 506a is a 3GPP AAA Server as defined in 3GPP architecture for WLAN to 3GPP interworking.

The authenticating peer 510a is an EAP SIM client.

SSD is used as K_root (it should be noted that other CDMA2000 keys can used like MN-AA).

The repository 508a on the network side 502a is a CDMA2000 HLR/AC.

The repository 512a on the user side 504a is a (R)UIM.

The access network 602 is a WLAN compliant with 802.1X. Only an access point (AP) is shown FIG. 6 which is part of the WLAN access network 602.

In FIG. 6, on the network side 502a the AAA 506a shall either get the K_root from the CDMA2000 network (e.g. SSD from HLR/AC 508a) or use the MN-AA stored therein as part of the packet data user's subscription. As shown, when SSD is used as the K_root, the SSD is retrieved from HLR/AC 508a by means of the IS-41 SS7 AUTHREQ message (see signal 604) (see also step 516 in FIG. 5). It can be seen that this requires providing the MSID and ESN to the HLR/AC 508a. The MSID and ESN can be retrieved from the user identity provided in the EAP-Response/Identity (see signal 606) or they can be retrieved from the packet data user's subscription.

Thereafter, the AAA 506a derives an EAP SIM authentication vector from the K_root and provides that authentication vector to the EAP SIM application (see box 6.1) (see also step 518 in FIG. 5). An exemplary way one can generate the GSM-like triplet within the authentication server 506a follows:

1. Generate a 128-bit random number, to be used as RAND.
2. Calculate K'=SHA1 (K_root|RAND), where "|" denotes concatenation. SHA1 is a one-way function that can be found in the document entitled "IETF RFC 3174 "US Secure Hash Algorithm 1 (SHA1)", September 2001. The contents of this document are incorporated by reference herein. The length of the resulting value, K', is 160 bits.
3. Take the first 32 bits of K' as SRES, and the next 64 bits as Kc. The remainder bits of K' are discarded.

Multiple variations of this procedure are also possible. For example, a different hash function might be utilized, or the selection of bits for SRES and Kc might be different. For instance, the last 32 bits of K' could be taken as SRES.

On the user side 504a, the authenticating peer 510a receives RAND as a challenge (see signal 608). The authenticating peer 510a requests and retrieves the K_root from the R(UIM) 512a (see signals 610 and 612). The authenticating peer 510a then processes the K_root and RAND to generate SRES and Kc (see box 6.2). Then, the authenticating peer 510a sends the SRES and Kc to the AAA 506a (see signal 614). The SRES and Kc values generated in the AAA 506a and the authenticating peer 510a should be the same.

If the exemplary procedure for generating a GSM-like triplet described above is followed in the network side 502a, then the procedure in the authenticating peer 510a and the user side 504a would be as follows:

1. Calculate K'=SHA1 (K_root|RAND).
2. Take the first 32 bits of K' as SRES, and the next 64 bits as Kc. The remainder bits of K' are discarded.

Figure 7:
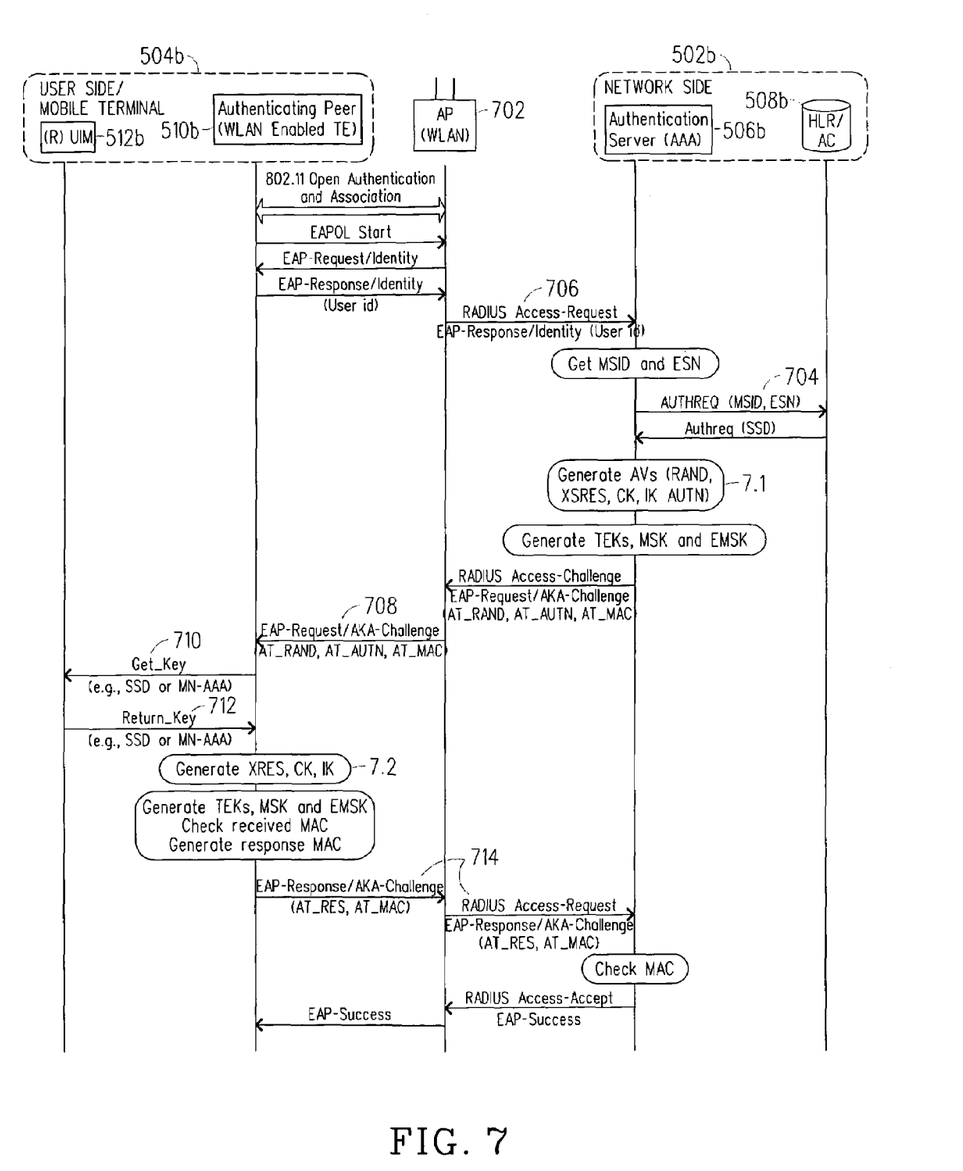
FIG. 7 is a signal flow diagram that illustrates a network side and a user side using a UMTS-like authentication method (EAP AKA) in a WLAN-CDMA2000 interworking scenario in accordance with a second embodiment of the present invention.

Following is a detailed discussion about how the authentication server 506 and the authenticating peer 510 generate UMTS-like authentication values in accordance with a second embodiment of the present invention. To aid in this discussion, an exemplary signal flow diagram is shown in FIG. 7 that illustrates an UMTS-like authentication method such as EAP AKA being used in a WLAN-CDMA2000 interworking scenario. The following assumptions have been made to accommodate this particular scenario:

The authentication server 506b is a 3GPP AAA Server as defined in 3GPP architecture for WLAN to 3GPP interworking.

The authenticating peer 510b is an EAP AKA client.

SSD is used as K_root (it should be noted that other CDMA2000 keys can used like MN-AA).

The repository 508b on the network side 502b is a CDMA2000 HLR/AC.

The repository 512b on the user side 504b is a (R)UIM.

The access network 702 is a WLAN compliant with 802.1X. Only an access point (AP) is shown FIG. 7 which is part of the WLAN access network 702.

In FIG. 7, on the network side 502b the AAA 506b shall either get the K_root from the CDMA2000 network (e.g. SSD from HLR/AC 508b) or use the MN-AA stored therein as part of the packet data user's subscription. As shown, when SSD is used as the K_root, the SSD is retrieved from HLR/AC 508b by means of an IS-41 SS7 AUTHREQ message (see signal 704) (see also step 516 in FIG. 5). It can be seen that this requires providing the MSID and ESN to the HLR/AC 508b. The MSID and ESN can be retrieved from the user identity provided in the EAP-Response/Identity (see signal 706) or they can be retrieved from the packet data user's subscription.

Thereafter, the AAA 506b derives an EAP AKA authentication vector (AKA quintet) from the K_root and provides that authentication vector to the EAP SIM application (see box 7.1) (see also step 518 in FIG. 5). An exemplary way one can generate the UMTS-like quintet within the authentication server 506b follows:

1. Generate a 128-bit random number to be used as RAND.
2. Generate AUTN. This could be a non-functional AUTN (e.g. a 128-bit random value), as discussed below. Alternatively, the AUTN could be based on a functional SQN. In this case, a suitable way to generate AUTN would be the one described in the aforementioned UMTS specification "3GPP TS 33.102 v.6.0.0 "Security Architecture (Release 6)". Note that variations from this are also possible (e.g. not to include the anonymity key AK).
3. Calculate K'=SHA1 (K_root|RAND).
4. Feed K' into a pseudo-random function in order to generate an output of at least 384 bits. For the purpose of this description, a pseudo-random function is a deterministic function that takes a number of input bits (160 bits in the case described) and generates a series of bits that have a property in which the bits in the series cannot be predicted without knowledge of the input bits. An exemplary pseudo-random function is described in the change notice 1 of the National Institute of Standards and Technology, Federal Information Processing Standards (FIPS) Publication 186-2 (with change notice), "Digital Signature Standard (DSS)", January 2000. The contents of this document are incorporated by reference herein.
5. Partition the resulting bit stream into suitable-sized chunks, to be used as keys in the following order: XRES (128 bits), CK (128 bits) and IK (128 bits). The remainder bits of the stream (if any) are discarded.

Multiple variations of this procedure are also suitable.

On the user side 504b, the authenticating peer 510b receives the AUTN (for network authentication) and RAND as a challenge (see signal 708). The authenticating peer 510b then requests and retrieves the K_root from the R(UIM) 512b (see signals 710 and 712). The authenticating peer 510b uses the K_root and RAND to generate XRES, CK and IK (see box 7.2). The authenticating peer 510b then sends the XRES, CK and IK to the AAA 506b (see signal 714). The XRES, CK and IK values generated in the AAA 506b and the authenticating peer 510b should be the same.

If the exemplary procedure for generating a UMTS-like quintet described above is followed in the network side 502b, then the procedure in the authenticating peer 510b on the user side 504b would be as follows:

1. Check AUTN if it is functional, otherwise discard it (see below).
2. Calculate K'=SHA1 (K_root|RAND).
3. Feed K' into the same pseudo-random function used in the network side 502, to generate an output of at least 384 bits.
4. Partition the resulting bit stream into suitable-sized chunks, to be used as keys in the following order: XRES (128 bits), CK (128 bits) and IK (128 bits). The remainder bits of the stream (if any) are discarded.

As described above, the UMTS authentication makes use of the AUTN which includes a SQN value (sequence number) that provides protection against replay attacks. This SQN value is maintained in both the network side 502b and the user side 504b. Unfortunately, all of this adds complexity to the second embodiment of the present invention. Two alternatives are described next which can be used to address this added complexity caused by the SQN:

1) Replicate the generation and maintenance of SQN in the authenticating server 506b and authenticating peer 510b. This might add undesired complexity to the solution, although a simplified approach could be used, such as using a SQN based on time/date. However, although a time based SQN could be appropriate e.g. for UMTS access, where the user side 504b obtains the time from the network side 502b over the radio channels, the situation is different for other types of access where the present solution could be used. For example, for WLAN access, the time/date at the user side 504b would typically be that configured at the access device 510b (e.g. a laptop 510b). However, the local time could be badly configured, and differ significantly from the time handled by the network side 502b. This is especially relevant for users traveling to networks at distant locations, and with different local times.

2) Not to use a functional SQN, and instead provide some other means for protection against replay attacks. Such an alternative way of protection using the MAC is proposed and described next.

Network authentication could be achieved by the utilization of a MAC value sent from the network side 502b towards the user side 504b. For example, EAP AKA sends such a MAC (128 bits long) in the message EAP-Request/AKA-Challenge (see signal 708). This MAC value provides the user side 504b with assurance that its home network 502b has generated the AKA-Challenge, since knowledge of the K_root key is needed to generate a proper MAC. However, an attacker could eavesdrop one valid AKA-Challenge, store it, and use it at a later stage in order to impersonate the network side 502b. Therefore, some protection against replay attacks would be desired.

This protection against replay attacks in network authentication can be achieved if the user side 504b always uses a different username (which implies that a different MAC is generated for the EAP-Request/AKA-Challenge) for each authentication attempt. This is possible, because, the username is part of the input used to generate the key used to produce the MAC. And, a different username implies that a different MAC is generated for the EAP-Request/AKA-Challenge. In fact, different grades of protection could be achieved if e.g. the same username is re-used under some circumstances. For example, it could be found acceptable to use the same permanent username more than once if it is used sparingly (i.e. if pseudonym and/or re-authentication identities are used most of the time).

A brief discussion is provided next about the different types of usernames that are possible in an EAP AKA method. In the EAP AKA method, user identification is based on Network Access Identifier (NAI) [RFC 2486]. The NAI realm username is in the form of an Internet domain name and identifies the user's Home carrier network as specified in RFC 1035. There are three types of usernames in EAP AKA peer identities:

(1) Permanent usernames. For example, 0123456789098765@myoperator.com might be a valid permanent identity. In this example, 0123456789098765 is the permanent username.

(2) Pseudonym usernames. For example, 2s7ah6n9q@myoperator.com might be a valid pseudonym identity. In this example, 2s7ah6n9q is the pseudonym username.

(3) Fast re-authentication usernames. For example, 3ro52h7vg@myoperator.com might be a valid fast re-authentication identity. In this example, 3ro52h7vg is the fast re-authentication username.

The first two types of identities are only used on full authentication and the last one only on fast re-authentication.

The permanent username is typically derived from the IMSI. And, the permanent username would typically have a format "0"|IMSI, where the character "|" denotes concatenation. In other words, the first character of the permanent username is the digit zero (ASCII value 0x30), followed by the IMSI. The IMSI is an ASCII string that does not have more than 15 decimal digits (ASCII values between 0x30 and 0x39) as specified in TS 23.003. Alternatively, one may choose a permanent username that is not based on the IMSI.

By using different usernames to protect against replay attacks in network authentication, the following impacts can be observed in the authenticating peer 510b:

If EAP AKA pseudonyms are supported, pseudonyms should not be re-used after one successful authentication procedure.

If EAP AKA fast re-authentication is supported, fast re-authentication usernames should not be re-used after one successful authentication procedure.

The EAP AKA permanent username should contain a nonce part, which is generated fresh for each authentication attempt. This nonce could be a random number.

Also, the authentication server 506b would be impacted as follows:

If pseudonyms are supported, the authentication server 506b should provide the authenticating peer 510b with a new pseudonym at each authentication procedure.

If fast re-authentication is supported, the authentication server 506b should provide the authenticating peer 510b with a new fast re-authentication username at each authentication procedure.

The authentication server 506b should also separate the nonce part of the permanent username, in order to locate the user.

A possible/potential limitation of this method for protecting against replay attacks is in the length of the user identities. The user identities are sent with the form of a NAI, according to the EAP AKA specification. And, the maximum length of a NAI that one can expect to be handled correctly by standard equipment is 72 octets. See, IETF RFC 2486 "The Network Access Identifier", January 1999. And, when EAP AKA is transported over RADIUS, this NAI is sent inside the User-Name attribute of a RADIUS Access-Request message, with standard length up to 63 octets (see signal 706). See, IETF RFC 2865 "Remote Authentication Dial In User Service (RADIUS)", June 2000. Therefore, it can be assumed that the maximum length of a WLAN user identity is 63 octets (i.e. 63 characters).

The user identity string contains the username, and additionally, it may include a realm portion, separated with "@". This means that the length of the username plus the length of the realm needs to be 62 characters or less.

The following considerations can be taken into account:

The default realm format proposed in EAP SIM and EAP AKA specifications has a maximum length of 23 characters, which allows a maximum length of 39 characters for the username.

The default realm format proposed in 3GPP specifications has a maximum length of 28 characters, which allows a maximum length of 34 characters for the username.

The nonce provided by the client side 504b in EAP SIM is 16-octets long. Nevertheless, a shorter nonce would likely be acceptable from a security standpoint.

The MSID is a user identity already utilized in CDMA2000 networks, and it could be used in the EAP AKA permanent identity. The MSID contains up to 15 digits, i.e. numerical characters, 0 through 9, which can be represented with 8 octets (i.e. 64 bits), utilizing 4 bits to represent each digit. The most significant bits can be padded by setting all the bits to 1.

E.g.: MSID=123456789012345

Representation: 0xF1 0x23 0x45 0x67 0x89 0x01 0x23 0x45

It should be noted that at reception of a username one can remove the padding, as none of the MSID digits are represented with 4 bits set to 1.

As indicated above, EAP AKA usernames follows the format of a NAI. In order, to convert a number of bits (e.g. a random nonce) into a printable string, the BASE64 method can be used which is described in section 4.3.2.4 of the following document:

IETF RFC 1421 "Privacy Enhancement for Internet Electronic Mail: Part I: Message Encryption and Authentication Procedures", February 1993. The contents of this document are incorporated by reference herein.

With this mechanism, each 6-bit group is used as an index into an array of 64 printable characters. For example, an MSID represented as suggested above (i.e. 8 octets) concatenated to a 16-octet nonce, requires (8+16)*8/6=32 characters, which leaves 30 characters for the realm part.

From the foregoing, it can be readily appreciated by those skilled in the art that the present invention described herein can be used in the network side 502 (e.g. 3GPP AAA server) and in the user side 504 (e.g. user's terminal) to adapt a root secret key (e.g. one of those already available in CDMA2000 networks, such as SSD or MN-AAA) for its utilization with a GSM-like or UMTS-like authentication method, such as EAP SIM or EAP AKA. In addition, the present invention can be used in WLAN-CDMA2000 interworking scenarios as shown in FIGS. 6 and 7.

Following are some features, advantages and uses of the present invention:
1) The present invention allows for the utilization of GSM-like and UMTS-like authentication in networks that do not have a GSM or UMTS infrastructure.
2) For the case of interworking of WLAN access networks and CDMA2000 networks, EAP SIM and EAP AKA are methods that meet 3GPP2 basic requirements. Therefore, 3GPP2 could make use of EAP SIM and/or EAP AKA as authentication methods in the corresponding 3GPP2 specifications.
3) The present invention described herein makes viable the utilization of EAP SIM and/or EAP AKA for authentication in CDMA2000 networks.
4) The present invention enables one to enhance an authentication server that was originally intended for the GSM/UMTS market and use it in the CDMA2000 market.

Although two embodiments of the present invention have been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

What is claimed is:

1. A system comprising:
a user side located in a non-Code Division Multiple Access 2000 (non-CDMA2000) network;
a network side, located in a CDMA2000 network, including an authentication server for authenticating a user terminal connected to the non-CDMA2000 network by using a root secret key in an authentication method selected from an EAP AKA authentication method, and an EAP SIM authentication method, wherein said network side and said user side achieve network authentication with protection against replay attacks by using a different username for each authentication attempt;
said user side including an authenticating peer that uses the root secret key in the authentication method; and
wherein said root secret key is shared between said user side and said network side.

2. The system of claim 1, wherein said network side and said user side do not require a GSM or UMTS infrastructure to perform the authentication method.

3. The system of claim 1, wherein the non-CDMA2000 network is a Wireless Local Area Network (WLAN) network.

4. The system of claim 1, wherein said username includes:
a permanent username;
a pseudonym username; and
a fast re-authentication username.

5. The system of claim 1, wherein said network side and said user side each use the root secret key to generate GSM triplets or UMTS quintets.

6. An authentication server used in a Code Division Multiple Access 2000 (CDMA2000) network to authenticate a user terminal connected to a non-CDMA2000 network, said authentication server comprising:
a processor for receiving an access request to authenticate the user terminal,
said processor for obtaining a root secret key shared between said user terminal and said CDMA2000 network; and
said processor for using the root secret key to derive an authentication vector used to authenticate the user terminal according to an authentication method selected from an EAP AKA authentication method, and an EAP SIM authentication method, wherein the authentication vector is an authentication vector selected from at least one of a GSM triplet, and a UMTS quintet.

7. The authentication server of claim 6, wherein the non-CDMA2000 network is a Wireless Local Area Network (WLAN) network.

8. A method used in a Code Division Multiple Access 2000 (CDMA2000) network for authenticating a user terminal connected to a non-CDMA2000 network, said method comprising the steps of:
a) receiving, at an authentication server in said CDMA2000 network, an access request for authenticating said user terminal;
b) obtaining, at the authentication server, a root secret key shared between said user terminal and said CDMA2000 network; and
c) using, at the authentication server, the root secret key to derive an authentication vector for authenticating the user terminal according to an authentication method selected from Extensible Authentication Protocol Authentication Key Agreement (EAP AKA) or Extensible Authentication Protocol Subscriber Identity Module (EAP SIM)
step c) further comprising
c1) sending, from said authentication server, an authentication challenge derived from said authentication vector to said user terminal;
c2) receiving, at said authentication server from said user terminal, an authentication response to said authentication challenge; and
c3) granting, from said authentication server, the access of the user terminal to the non-CDMA2000 network if said authentication response is satisfactory.

9. The method of claim 8, wherein the non-CDMA2000 network is a Wireless Local Area Network (WLAN) network.

10. A method for using an Extensible Authentication Protocol Authentication Key Agreement (EAP AKA) authentication mechanism to enable WLAN-CDMA2000 Wireless Local Area Network-Code Division Multiple Access 2000 (WLAN-CDMA2000) network interworking, said method comprising the steps of:
on a network side:
receiving an access-request message from a WLAN at an authentication server;
generating at the authentication server an EAP AKA authentication vector including RAND and AUTN using a CDMA2000 root secret key; and
sending from the authentication server an access-challenge message which contains the RAND, the AUTN and a Message Authentication Code to the WLAN; and
on a user side:
receiving an access-challenge message which contains the RAND, the AUTN and a MAC from the WLAN;
generating RES, IK and CK using the CDMA2000 root secret key;
sending a response to the access-challenge message which contains the RES and the MAC to the WLAN; and on the network side:
  receiving at the authentication server a response to the access-challenge message which contains the RES and the MAC from the WLAN; and
  checking at the authentication server the response to the access-challenge message and if the authentication is successful then sending an access-accept message to the WLAN; and
on the user side:
  receiving an access-accept message from the WLAN.

11. An authentication server used in a Code Division Multiple Access 2000 (CDMA2000) network for authenticating a user terminal connected to a non-CDMA2000 network, the authentication server comprising:
  means for receiving an access request for authenticating the user terminal;
  means for obtaining a root secret key shared between the user terminal and the CDMA2000 network; and
  means for utilizing the root secret key to derive an authentication vector, usable in a Global system for Mobile Communications (GSM) or a Universal Mobile Telecommunications System (UMTS), for authenticating the user terminal according to an authentication method selected from Extensible Authentication Protocol Authentication Key Agreement (EAP AKA), and Extensible Authentication Protocol Subscriber Identity Module (EAR SIM) wherein the means for utilizing the root secret key includes:
  means for sending an authentication challenge usable in a GSM or a UMTS derived from the authentication vector to the user terminal;
  means for receiving from the user terminal, an authentication response usable in a GSM or a UMTS to the authentication challenge; and
  means for granting the access of the user terminal to the non-CDMA2000 network if the authentication response is satisfactory.

* * * * *